United States Patent Office 3,322,154
Patented May 30, 1967

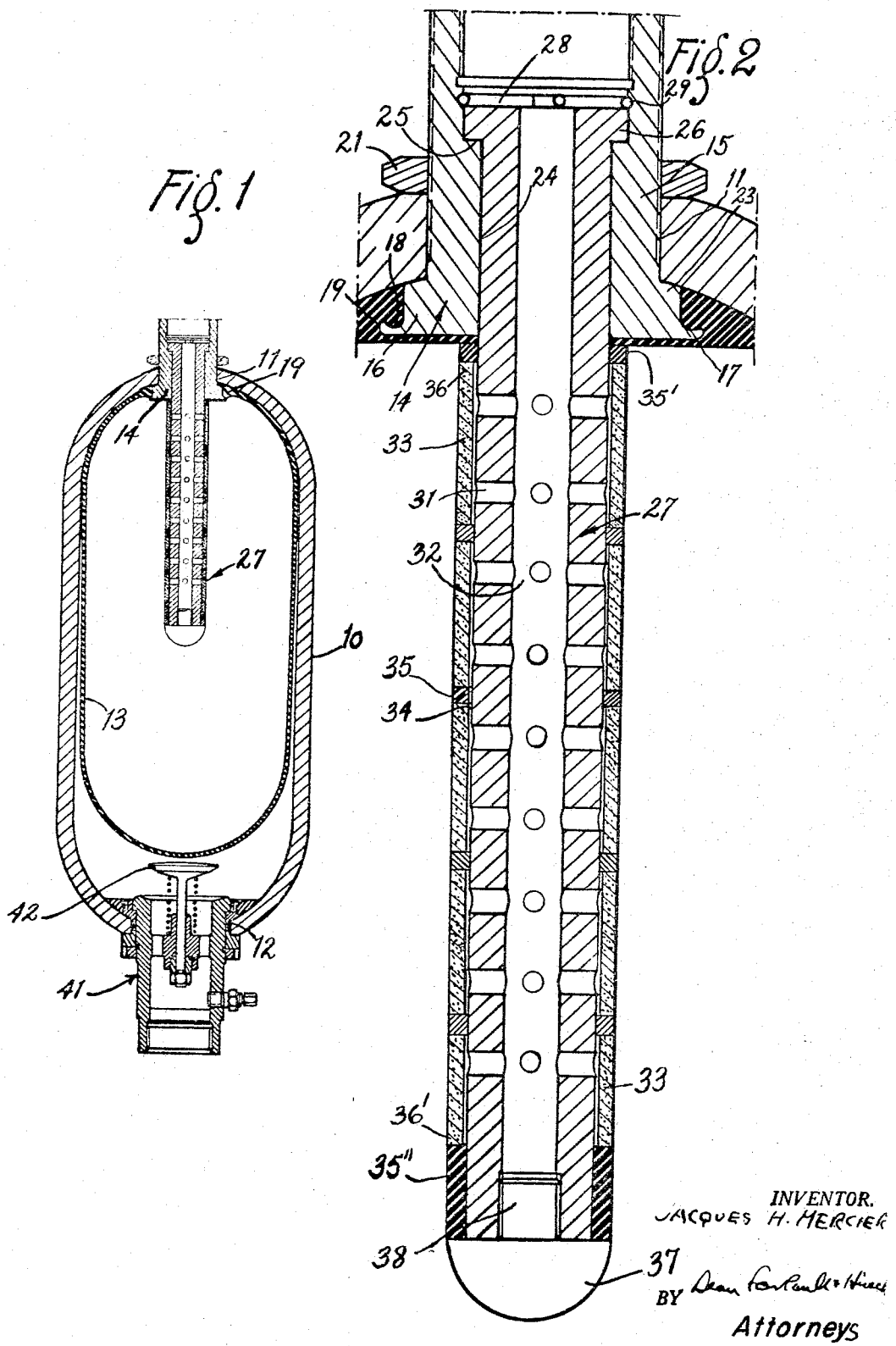

3,322,154
PRESSURE VESSEL
Jacques H. Mercier, New York, N.Y., assignor to Mercier
Olaer Patent Corporation, Wilmington, Del., a corporation of Delaware
Filed Jan. 13, 1965, Ser. No. 425,271
Claims priority, application France, Jan. 24, 1964,
961,441
7 Claims. (Cl. 138—30)

This invention relates to the art of pressure vessels, more particularly of the type having a deformable partition therein.

As conducive to an understanding of the invention, it is noted that where such pressure vessels are of a large size and the partition is an elongated bladder or sleeve, between the two fluids under pressure contained therein, which is compressed during operation, it is likely to rub against the side wall of the vessel with possibility of rupture of the bladder or sleeve and failure of the pressure vessel. In addition, when such elongated bladder or sleeve is compressed, it may form a sharp fold which is also likely to cause rupture.

Where, to prevent rubbing of the bladder against the side wall of the vessel and the formation of sharp folds in the bladder, a rigid guide member is positioned in the bladder with one end secured to the vessel adjacent the same portion to which the mouth of the bladder is positioned and the free end of the guide member spaced from the free end of the bladder, and the rigid guide member has a central bore with lateral perforations to permit flow of fluid through the guide member into the bladder, unless the perforations are extremely small, extrusion of the bladder when it presses against the central guide member may occur and if the perforations are very small, insufficient flow of fluid may result.

Where, to prevent extrusion of the bladder and permit sufficient flow of fluid an elongated sleeve of porous material such as sintered bronze for example, of length substantially the length of the central guide member is positioned around the latter and snugly encompasses the same, although there will be adequate flow of fluid through the perforations in the central guide member and through the porous sleeve and although extrusion of the bladder will be precluded by reason of the intervening porous sleeve, due to the differences in the coefficient of expansion between the central guide member which is generally of a strong material such as steel and the porous sleeve, the sleeve generally breaks after a short period of use. The problem of such differential expansion is enhanced by the fact that there are rapid variations in temperature brought about by the pressure drops in the fluids in the pressure vessel during use of the unit.

It is accordingly among the objects of the invention to provide a pressure vessel of the above type which has a rigid perforated central guide member positioned in the bladder thereof and in which such bladder is precluded from rubbing against the side wall of the container and is not likely to form sharp folds, thereby preventing rupture of said bladder with resultant failure of the unit and in which flow of fluid through the central guide member into the bladder is substantially unimpeded without likelihood of extrusion of the bladder through the perforations in the central guide member.

According to the invention these objects are accomplished by the arrangement and combination of elements hereinafter described and particularly recited in the claims.

In the accompanying drawings in which is shown one of various possible embodiments of the several features of the invention, FIG. 1 is a longitudinal sectional view of one embodiment of the invention, and FIG. 2 is a longitudinal sectional view of the central guide member on a greatly enlarged scale.

Referring now to the drawings, as shown in FIG. 1, the pressure vessel comprises a container 10 of strong rigid material such as steel, cast aluminum or the like, capable of withstanding high pressure and having a pair of ports 11 and 12 preferably axialy aligned at opposed ends of the container.

The container 10 may be spherical or cylindro-spherical as shown and has a partition 13 therein intervening between said ports 11 and 12, defining a variable volume chamber on each side. The partition 13 preferably is a collapsible and expansible bladder of resilient material such as rubber or synthetic plastic of like physical characteristics, which in distended but substantially unstretched condition is smaller than the cavity of the container 10 and has its longitudinal axis aligned with the ports 11 and 12.

The bladder 13 is securely affixed in the container 10 preferably by means of a fitting 14 which desirably has a substantially cylindrical stem portion 15 with a base disc 16 presenting an outstanding lateral flange 17 which desirably has an annular groove 18 in its upper face in which may be positioned the thickened rim 19 about the mouth of the bladder 13.

Thus with the stem portion 15 positioned in port 11 and protruding beyond the latter, when a nut 21 screwed on the protruding portion of stem 15 is tightened, the rim 19 of the bladder 13 will be clamped between flange 17 and the adjacent wall of the container 10, securely to hold the rim 19 in place, an annular shoulder 23 adjacent the root end of stem 15 abutting against the peprehery of port 11 to prevent cutting of the rim 19 of the bladder by excessive tightening of nut 21.

The bore 24 of fitting 14 has an enlarged diameter portion defining an annular shoulder 25 on which is seated the flanged end 26 of an elongated rigid tube 27 which may be of steel, for example. The tube may be securely retained in position as by a snap ring 28 seated in an annular groove 29 in the bore of fitting 14.

The tube 27 which is of length less than the length of the container 10, has a plurality of longitudinally spaced radial perforations 31 through the wall thereof and which lead into the bore 32 of the tube.

Encompassing the length of the tube 27 is a plurality of relatively short cylindrical sleeves 33. Each of the sleeves is of porous material such as sintered bronze and is of inner diameter slightly greater than the outer diameter of the tube 27 to define a clearance 34 therebetween.

The sleeves 33 are spaced from each other by intervening resilient rings 35, preferably of rubber which may be natural or synthetic. The resilient rings 35 have an inside diameter equal to or slightly less than the outside diameter of the central tube 27 so as to snugly engage the latter.

As is clearly shown in FIG. 2, a spacer ring 35' is positioned between the end 36 of the adjacent porous sleeve 33 and the undersurface of the fitting 14. Additional spacer rings 35 are positioned between the ends of adjacent porous sleeves 33. The porous sleeves 33 are retained on the central tube 27 by means of a bolt 37 which has a rounded head and which has its threaded stem 38 screwed into the correspondingly internally threaded end of the bore 32 of the tube 27. The base of the bolt 37 at the root end of stem 38 is of maximum diameter substantially the same as that of the outer diameter of each of the porous sleeves 33 and a resilient spacer sleeve 35" preferably of rubber, encompasses the lower end of the tube being positioned between the base of the bolt 37 and the end 36' of the adjacent porous sleeve 33.

As is clearly shown in FIG. 2, the spacer rings 35 are located substantially midway between the radial openings 31 in the tube 27 to prevent extrusion of the resilient separator bladder 13 through the perforations or openings 31 when the bladder presses against the outer surface of the porous sleeves 33 and the spacer rings 35 during operation of the unit in the manner hereinafter to be described.

The port 12 of the pressure vessel is desirably controlled by a suitable poppet valve 41, the spring-urged valve head 42 of which is adapted to be engaged by the bladder 13 for closure of said valve. As such valve may be of the type shown in U.S. Patent No. 2,924,244, and per se forms no part of this invention, it will not be further described.

In the operation of the unit shown in FIG. 1, a fluid such as gas under pressure is introduced through a suitable air valve (not shown) located in the upper end of fitting 14 and such gas will flow through the axial bore 32 of tube 27 and through the perforations or openings 31 in such tube. Thereupon, the gas under pressure will flow through the porous wall of the plurality of sleeves 33 into the bladder 13 to charge the latter and such bladder will expand to engage the wall of the container 10.

A fluid such as oil under pressure is forced into the container 10 through valve 41 further to compress the gas in the bladder. In use of the charged unit, when a valve (not shown) in a line connected to valve 41 is opened, the bladder 13 will expand to force the fluid in the container out of the latter and when substantially all of the fluid has been expelled, the expanded bladder will engage the valve head 42 to close the latter to prevent extrusion of the bladder. When the bladder 13 is compressed by the introduction of oil under pressure through valve 41, in the absence of the central guide defined by the tube 27 and the encompassing porous sleeves 33, it would tend to form folds and sharp creases which might cause rupture of the bladder. In addition, as the bladder would be floating in the incompressible oil, it might rub against the wall of the container with resultant rupture.

By reason of the central guide 27, sharp folds in the compressed bladder are substantially precluded and in addition the bladder will be retained away from the container wall.

By reason of the short lengths of porous sleeves 33 and the intervening spacer rings 35, differences between the coefficients of expansion of the porous sleeves 33 and the tube 27 which might cause one of these members to elongate at a different rate than the other, would be taken care of since the intervening resilient rings 35 will expand and contract. Furthermore, by reason of the spacing 34 between the inner diameter of the porous sleeves 33 and the outer diameter of the inner tube 27, radial differences in the coffiecient of expansion will also be taken care of.

As a result of the construction above described, a high rate of fluid flow between the interior of the bladder and the bore 32 of the central tube 27 may be achieved with assurance that there will be no extrusion of the bladder and by reason of the unique construction of the central guide member 27, differences between the coefficient of expansion of the rigid tube 27 and the porous sleeves 33 will also be taken care of to prevent breakage or bursting of such porous sleeves.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure vessel comprising a rigid container having a deformable partition therein defining two chambers for fluid, each having a fluid passageway leading thereinto, an elongated central guide member for said partition in one of said chambers, said central guide member comprising a rigid tube having a plurality of perforations therein and porous means encompassing at least a portion of said tube, said partition encompassing said central guide member, the latter having a substantially continuous surface with respect to said partition to restrain passage therethrough of the partition, said surface permitting passage therethrough of the fluid flowing through one of said fluid passageways, said central tube and said porous means each having a different coefficient of expansion and means to take up the differences in the coefficients of expansion of the central tube and the porous means to prevent cracking of said porous means.

2. The combination set forth in claim 1 in which said porous means comprises a porous sleeve encompassing said central tube and the means to take up the differences in the coefficients of expansion comprises a resilient member encompassing said central tube, an end of the porous sleeve abutting against said resilient member.

3. The combination set forth in claim 1 in which said porous means comprises a porous sleeve encompassing said central tube and the means to take up the differences in the coefficients of expansion comprises a resilient member encompassing said central tube, an end of the porous sleeve abutting against said resilient member, the inner diameter of said porous sleeve being slightly greater than the outer diameter of said central tube to provide an expansion space therebetween.

4. The combination set forth in claim 1 in which said porous means comprises a plurality of porous sleeves encompassing said central tube and the means to take up the differences in the coefficients of expansion comprises a plurality of resilient rings encompassing said central tube and intervening respectively between the adjacent ends of adjacent porous sleeves, said adjacent ends abutting against the associated resilient ring.

5. The combination set forth in claim 1 in which said porous means comprises a plurality of porous sleeves encompassing said central tube, the inner diameter of said porous sleeves being slightly greater than the outer diameter of said central tube to define an expansion space therebetween, the means to take up the differences in the coefficients of expansion comprises a plurality of resilient rings encompassing said central tube and intervening respectively between adjacent ends of adjacent porous sleeves, said adjacent ends abutting against the associated resilient ring.

6. The combination set forth in claim 1 in which said central tube has a head secured to the free end thereof, said head being of diameter greater than the outer diameter of said tube, said porous means comprises a plurality of porous sleeves encompassing said central tube, the inner diameter of said porous sleeves being slightly greater than the outer diameter of said central tube to define an expansion space therebetween, the means to take up the differences in the coefficients of expansion comprises a plurality of resilient rings encompassing said central tube and intervening respectively between adjacent ends of adjacent porous sleeves, said adjacent ends abutting against the associated resilient ring, and a resilient ring interposed between the head of said end member and the adjacent end of the adjacent porous sleeve.

7. The combination set forth in claim 1 in which said partition is an elongated bladder having a port at one end, said port being secured to one of the ends of said container and in communication with the associated port thereof, said central tube being secured to said port of said container and extending axially in said bladder, the free end of said tube being spaced from the free end of said bladder.

References Cited
UNITED STATES PATENTS 3,004,560 10/1961 Leffler et al. _____ 138—30
3,195,577 7/1965 Greer _____ 138—30

LAVERNE D. GEIGER, *Primary Examiner.*

T. L. MOORHEAD, *Assistant Examiner.*